United States Patent [19]

Koike et al.

[11] Patent Number: 5,103,442
[45] Date of Patent: Apr. 7, 1992

[54] SIMPLIFIED ACOUSTIC PLAYBACK APPARATUS

[75] Inventors: Eishi Koike, Sagamihara; Seiji Ohata, Kawasaki, both of Japan

[73] Assignee: Ozen Corporation, Tokyo, Japan

[21] Appl. No.: 387,340

[22] Filed: Jul. 31, 1989

[30] Foreign Application Priority Data

Jul. 30, 1988 [JP] Japan .......................... 63-101539[U]

[51] Int. Cl.$^5$ ............................................ G11B 17/06
[52] U.S. Cl. ......................................... 369/67; 369/63; 369/65
[58] Field of Search .................... 369/63, 65, 66, 67

[56] References Cited

U.S. PATENT DOCUMENTS

| | | | |
|---|---|---|---|
| 3,784,211 | 1/1974 | Summerfield | 369/65 |
| 4,486,871 | 12/1984 | Koike | 396/67 |
| 4,510,590 | 3/1985 | Girton et al. | 369/67 X |
| 4,622,658 | 11/1986 | Koibe | 369/67 X |
| 4,680,747 | 7/1987 | Blake, III | 364/67 X |
| 4,694,446 | 9/1987 | Koike | 396/67 |
| 4,800,305 | 1/1989 | Koike | 364/67 |
| 4,811,322 | 3/1989 | Koike et al. | 369/67 X |
| 4,827,465 | 5/1989 | Koike | 369/67 |

*Primary Examiner*—William M. Shoop, Jr.
*Assistant Examiner*—David Martin
*Attorney, Agent, or Firm*—Weintraub, DuRoss & Brady

[57] ABSTRACT

A simplified acoustic disk record playback apparatus is disclosed having a battery-powered motor driving a turn table through a belt and pulley system. The turn table is centrally mounted on a rotating shaft. Overlying the turn table is a disk record which may have a plurality of grooves starting on its periphery. The turn table is spring biased towards a tone arm and associated record pickup stylus. The tone arm pivots horizontally, parallel to the plane of the disk record, but is held vertically by an overlying speaker cone, and is spring biased to a beginning playback position. The tone arm carries a center gear locking member on that side proximal to the turn table rotating shaft. A center gear is mounted on the turntable rotating shaft coplanar with the tone arm. Located on the turn table center, or rotating, shaft beneath the center gear is a two piece can assembly which lengthens when twisted. As the tone arm reaches the end of the disk record playback, the center gear locking member locks the center gear to stop the rotation of half the cam assembly, subjecting the cam to twisting and lengthening, thereby countering the spring bias of the turn table and allowing the tone arm to return to a playback position.

12 Claims, 3 Drawing Sheets

SIMPLIFIED ACOUSTIC PLAYBACK APPARATUS

BACKGROUND OF THE INVENTION

1. Field of the Invention

The present invention relates to a simplified acoustic playback apparatus for reproducing a disk record with a simple structure.

2. Description of the Prior Art

In the art of simplified acoustic playback apparatus having a stylus force releasing mechanism, an apparatus is disclosed in U.S. Pat. No. 4,694,446 in which a cam mechanism is provided between a center gear and a turn table, and the cam mechanism is operated by the action of a tone arm engaging a free gear attached to an oscillation arm, which in turn engages the center gear.

However, in such a prior simplified acoustic playback apparatus, a problem is involved in that an oscillation arm is provided to move the free gear in a fixed range, and the apparatus becomes complicated due to an increase of movable members. As a result, a failure tends to occur in the mechanism. Furthermore, the assembling of numerous parts is time consuming and troublesome. In particular, since this apparatus is intended to be used for continuous playback, the frequency of operation is necessarily high, and the probability of failure becomes correspondingly high since two separate contact surfaces must mesh to release the stylus force: one between the center gear and the free gear, and another between the free gear and the tone arm.

A simplified acoustic playback apparatus as disclosed in U.S. Pat. No. 4,486,871 discloses a single face cam and a lever mechanism which force a spring loaded turn table downward to release stylus pressure. The release pressure is maintained for a fixed time by cooperating lever faces located beneath the turn table. This system does not permit random playback of multiple modulated disk record grooves.

SUMMARY OF THE INVENTION

The present invention solves the above-stated problems in the prior art. It is an object of the invention to provide a compact, durable, simplified acoustic playback apparatus by simplifying a stylus force releasing mechanism.

Another object of the invention is to provide a simplified acoustic playback apparatus which is simple to assemble.

A simplified acoustic playback apparatus according to the present invention includes a turn table having a disk record placed thereon, a turn table driving device and a center gear coaxial with the turn table. A tone arm having a pickup at a tip end is provided to scan a modulated groove on the disk record. A center gear locking member is provided on the tone arm to release the stylus force on the disk record by engaging with the center gear to operate a cam mechanism disposed between the center gear and the turn table when the pickup reaches a playback finishing point.

The center gear locking member may be formed by a claw provided on the tone arm.

Furthermore, it is preferable to support this claw parallel to the tone arm by an elastic member.

In this case, the elastic member may be formed by a bar-shaped elastic arm, and the claw and elastic arm are formed integrally with the tone arm.

The center gear locking member may be formed by a free gear provided on the tone arm. This free gear has a long intermittent tooth portion with a tooth crest longer than that of other normal teeth.

In the simplified acoustic playback apparatus, when the pickup reaches the playback finishing point after scanning or demodulating the modulated groove of the disk record, the center gear locking member abuts against a side of the center gear to stop the rotation of the center gear. And when the rotation of the center gear is stopped, a first and a second cam piece are displaced from each other in a direction of rotation to expand the length of the cam mechanism thereby to depres the turn table. As a result, the stylus force of the pickup is released, and the pickup is returned to a playback starting point by a return spring attached to the tone arm.

In the case where the center gear locking member is formed by the claw, this claw hooks or holds a tooth of the center gear to stop the rotation of the center gear.

Furthermore, where the claw is supported by an elastic member, even when the timing for engagement of the claw between tooth crests of the center gear is not appropriate, the shock is absorbed by the elastic member and the vibration is not imparted to the tone arm.

Moreover, when the elastic member is formed by a bar-shaped elastic arm and the elastic arm is formed integrally with the tone arm together with the claw, the manufacturing process of the apparatus can be simplified, and the structure becomes more durable since the elastic arm can not be removed or slipped off the tone arm.

Furthermore, when the free gear is used as the center gear locking member, at the initial stage of the engagement of the center gear with the free gear, both gears rotate interlocked. However, when the intermittent portion of the free gear is reached in the engagement portion, the center gear has no counterpart and the rotation is stopped. In addition, when the disk record has a plurality of modulated grooves, the stopping position of the disk record can be decided at random to provide a variable series of reproduced sounds.

DESCRIPTION OF THE PREFERRED EMBODIMENTS

FIGS. 1 to 5 show the structure of the first embodiment generally comprising a casing 1, a turn table unit, a sound reproduction system, a cam mechanism, and a drive system as fully described below.

Figure 1:
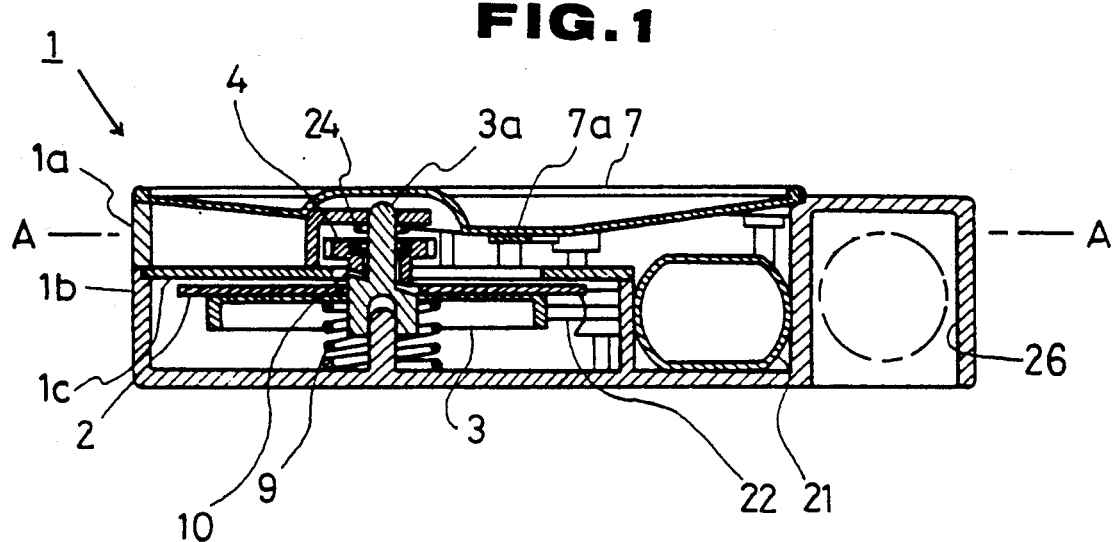
FIG. 1 is a sectional side view of a first embodiment of the present invention

As shown in FIG. 1, a casing 1 includes a chassis 1a, a housing 1b, and an intermediate partition plate 1c. The chassis 1a has a first hollow formed therein. A disk record 2 and a turn table, or turn table platter, 3 are accommodated within the chassis 1a. The intermediate partition plate 1c is joined to the chassis 1a to enclose the hollow portion. The turn table central shaft 3a is rotatably supported by a finger 31 of the chassis 1a and by the intermediate partition plate 1c so as to be movable linearly in a reciprocating fashion proximal and distal to the tone arm.

The disk record 2, which has a plurality of modulated grooves 2' formed therein, is coaxially secured to an upper surface of the turn table 3. The plurality of modulated grooves have spaced apart playback starting points on a peripheral portion of the disk record 2', and have playback finishing points at a center portion of the disk 2 so that a plurality of recorded sounds can be reproduced. Furthermore, a center gear 4 having a plurality of protruding teeth 4a is slidably fitted in an axial direction to the rotating shaft 3a of the turn table 3.

As best seen in FIG. 5, a cam mechanism 10 is provided between the turn table 3 and the center gear 4. The cam mechanism 10 includes a first cam piece 10a located at a lower portion of the center gear 4 and formed integrally therewith. The first cam piece 10a has a first cam piece mating surface 10c distal from the center gear 4 and inclined to rotating shaft 3a. A second cam piece 10b, formed at a central upper portion of the turn table 3 has a second cam piece mating surface 10d, distal from the record disk 2 and inclined to rotating shaft 3a. A stylus force spring 9 is provided at a lower surface of the turn table 3 to urge the turn table 3 and the disk record 4 towards the tone arm 5. A cam stabilizing spring 24 is provided at an upper portion of the center gear 4 to stabilize an engagement of the first and second cam piece mating surfaces 10c and 10d in the axial direction of rotating shaft 3a.

Figure 2:
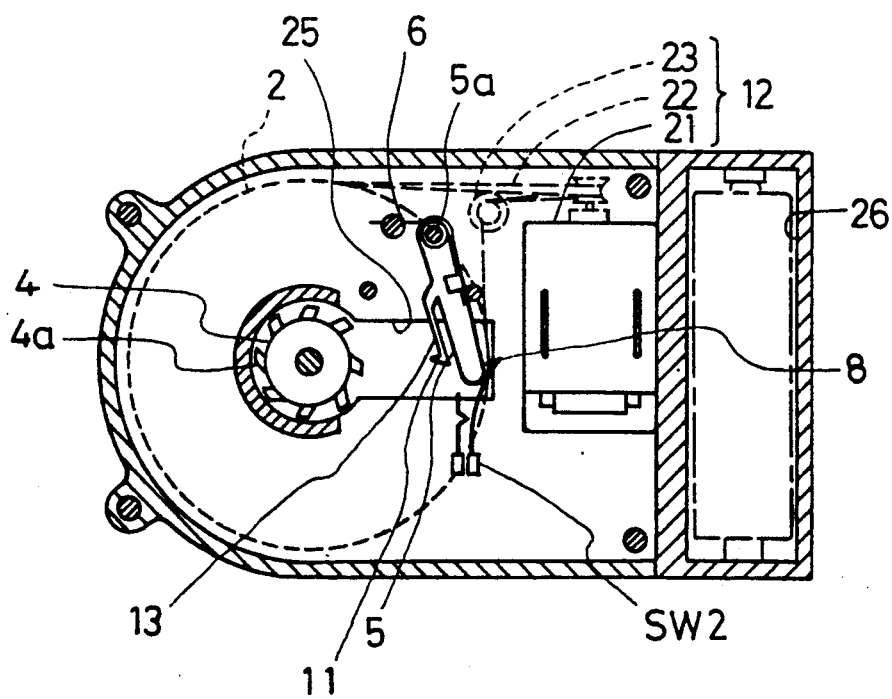
FIG. 2 is a sectional view taken along the line A—A in FIG. 1.

As shown in FIG. 2, a tone arm 5 having a pickup 8 formed at the tip end thereof is mounted opposite the tip end on the intermediate partition plate 1c so that the tone arm 5 is pivotable parallel to the plane of disk record 2. A claw, or claw-like member, 11 constituting a center gear locking member, is provided at a side of the tone arm 5 facing the rotating shaft 3a of the turn table platter 3 so that the claw 11 engages with the protruding teeth 4a of the center gear 4 when the tone arm 5 approaches the rotating shaft 3a. This claw 11 is formed integrally with the tone arm 5, which is an elastic member. The claw 11 is integrally connected at a free end of an elastic arm 13 of a bar shape which is branched from the side of the tone arm 5 and lies substantially parallel thereto. The shapes of the protruding teeth 4a of the center gear 4 and the claw 11 are not limited to that shown in FIG. 2, and any appropriate shapes may be employed.

A return spring 6 bridges the tone arm 5 and the intermediate partition plate 1c in a condition in which the return spring 6 is wound around the supporting point 5a of the tone arm 5. As a result, the tone arm 5 is biased towards the disk record 2 and the playback starting point of the turn table 3.

Furthermore, a switch SW2 of a driving device 12 is provided at a position at which the switch SW2 abuts against the tip end of the tone arm 5. When the pickup 8 is at the playback starting point, contacts of the switch SW2 are separated to turn off the switch SW2.

The intermediate partition plate 1c is formed with an aperture 25 therein for the pickup 8 to travel along a locus of the pivotal movement of the tone arm 5. A playback stylus 8a fixed to the tip end of the pickup 8 abuts an upper surface of the disk record 2 through the aperture 25. In other words, the turn table 3 normally pushes towards the playback stylus 8a by the stylus force spring 9, and thus, the pickup 8 applies a stylus force to the disk record 2.

The housing 1b defines a second hollow, and is joined to the chassis 1a to enclose protruding members on the intermediate partition plate 1c. A truncated cone shaped speaker 7 is secured to the housing 1b. A smooth surface 7a is formed at a cone portion of the speaker 7. In a condition in which the housing 1b is joined to the chassis 1a, the tone arm 5 is slidably in contact with the surface 7a.

The driving device 12 includes a motor 21, a driving belt 22, and a pulley 23. The motor 21 is mounted at an end of the chassis 1a, and the driving belt 22 is wound in a loop to extend between the a driving shaft of the motor 21 and a side of the turn table 5 and back through the pulley 23. Furthermore, a battery box 26 is provided on a side portion of the motor 21 to supply power to the motor 21.

Figure 3:
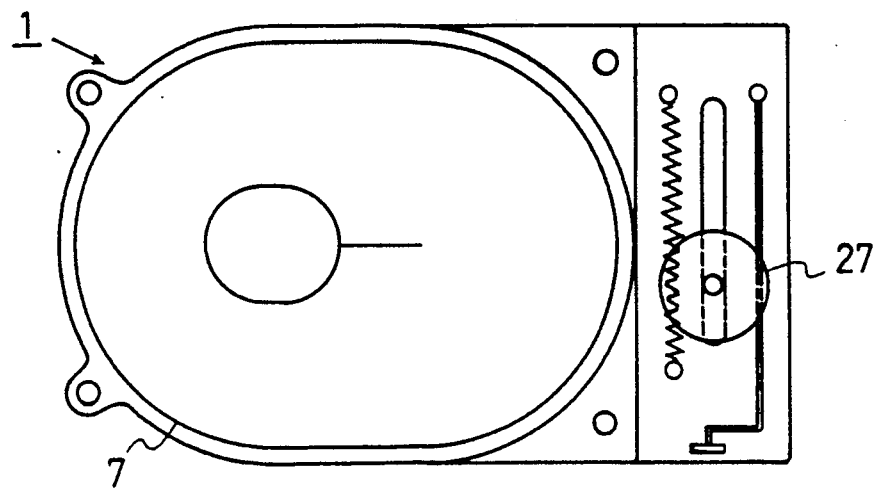
FIG. 3 is a plan view of the first embodiment.
Figure 4:
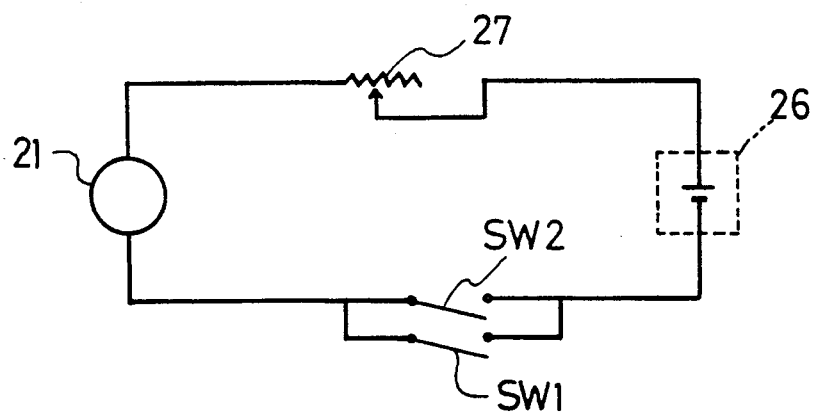
FIG. 4 is a circuit diagram in the first embodiment.

As shown in FIG. 3, a speed controller 27 having a variable resistor is provided on an outer surface of the apparatus to control the rotational speed of the driving device 12. An electrical circuit provided on the casing 1 is shown in FIG. 4. A circuit between the battery box 26 and the motor 21 via the speed controller 27 is in series with a switch SW1 provided externally and a switch SW2. In this case, the switch SW1 and the switch SW2 are connected in electrical parallel to each other.

The operation of the first embodiment will now be described.

Preferably, the external switch SW1 is spring-loaded. Upon depressing the external switch SW1 to close the circuit manually, the driving device 12 starts to turn the turn table 3 and the disk record 2 to thereby commence the playback. As the pickup 8 is urged forward in one of the modulated grooves 2' on the upper surface of the disk record 2, the playback progresses, and the tone arm 5 moves towards the playback finishing point on the disk record 2. In a short time the pickup 8 is separated from the switch SW2 and this switch is turned on. As a result, the energization of the motor 21 is maintained even when the hand is released from the switch SW1. In other words, the switch SW1 is depressed for only a short time before the switch SW2 is also switched to the on state. The apparatus then continues its playback operation even after the spring loaded switch SW1 is released.

Figure 5A:
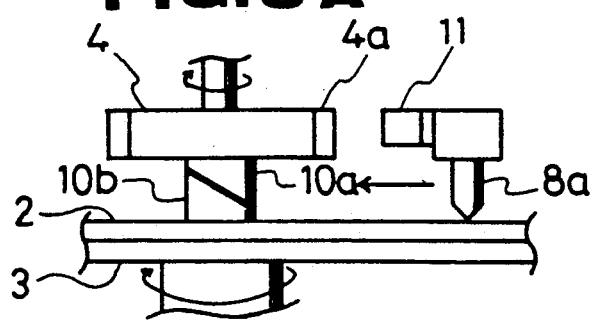
FIGS. 5A and 5B show the operation of a cam mechanism in the first embodiment.
Figure 5B:
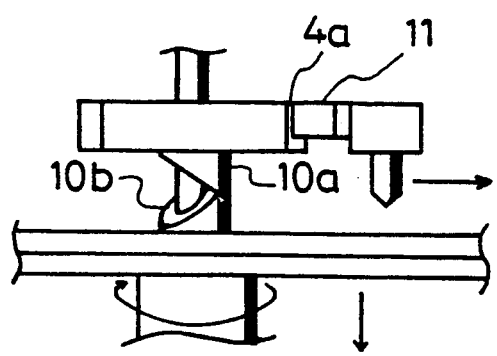

FIGS. 5A and 5B show the operation of the cam mechanism 10.

When the playback of the recorded sounds draws to an end, the claw 11 formed on the tone arm 5 abuts against the center gear 4, and engages the protruding teeth 4a of the center gear 4. At this time, the center gear 4, which has been rotating in synchronism with the turn table 3, is stopped from rotation by the claw 11. However, on the other hand, the turn table 3 still continues rotation. Thus, a torsion is caused between the first cam piece 10a and the second cam piece 10b, respectively provided on the center gear 4 and the turn table 3, and the second cam piece 10b rides downward on the first cam piece 10a. As a result, the cam mechanism 10 is expanded in the axial direction to depress the turn table 3 against the biassing of the stylus force spring 9. Consequently, the stylus force applied by the pickup 8 is released to disengage the stylus 8a from the upper surface of the disk record 2. With the stylus disengaged the tone arm 5 is returned to the playback starting point due to the biassing of the return spring 6. At this time, the pickup 8 provided on the tip end of the tone arm 5 opens the contacts of the switch SW2 again, to thereby stop the operation of the driving device 12. Furthermore, when the pickup 8 moves away from the playback finishing point, the restriction of rotation of the center gear 4 is released. As a result, the first cam piece 10a which is subjected to the biassing of the cam stabilizing spring 24, restores the torsion at a cam surface of the second cam piece 10b to shorten the length of the cam mechanism 10. Accordingly, the turn table 3 moves upwardly due to the biassing of the stylus force spring 9, and the stylus force is again applied by the pickup 8.

By repeating a series of operations as mentioned above, the playback of the recorded sounds can be performed any number of times as desired.

Further, at the time of engagement of the protruding teeth 4a of the center gear 4 with the claw 11, even when meshing between both members is prevented due to asynchronous timing of the rotation of the center gear 4 and the advance of the claw 11, the shock is absorbed by the elastic arm 13 or elastic bar. As a result, damage to the claw 11, or further, damage to the modulated groove of the disk record 2 by the playbak stylus 8a can be prevented.

Figure 6:
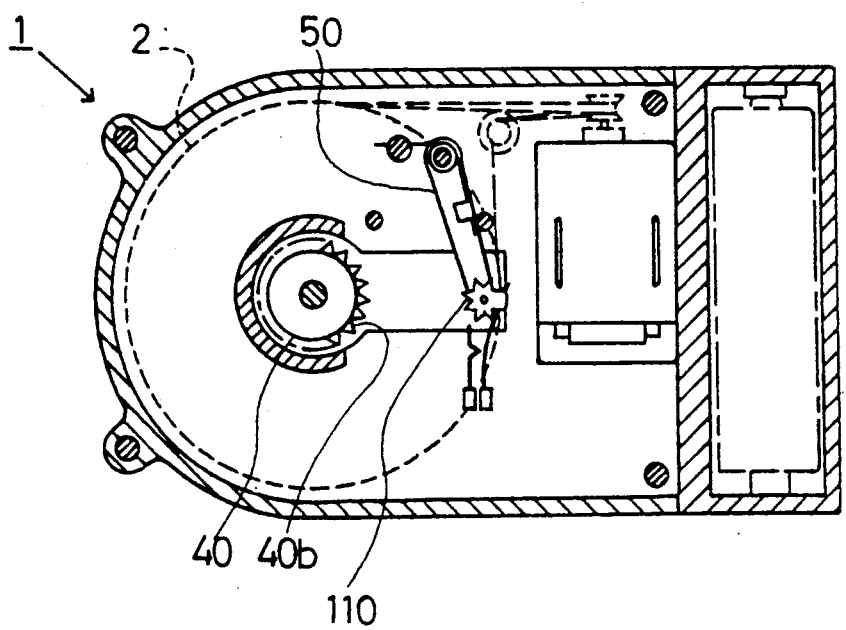
FIG. 6 is a sectional plan view of a second embodiment.

In the second embodiment as shown in FIGS. 6 and 7, a tone arm 50 has a free gear, as a center gear locking member 110, in place of the claw. The free gear 110 has a unformed portion or intermittent portion 110a in which regular gear teeth 110b are not formed for a certain interval along the periphery or outside diameter surface, resulting in a toothcrest longer than that of normal teeth 40b. The free gear 110 is rotatably attached to a tip end of the tone arm 50. Moreover, in the second embodiment, a center gear 40 has teeth 40b formed at the periphery thereof which engage the teeth 110b of the free gear 110.

The rest of the structure is the same as the first embodiment.

Figure 7A:
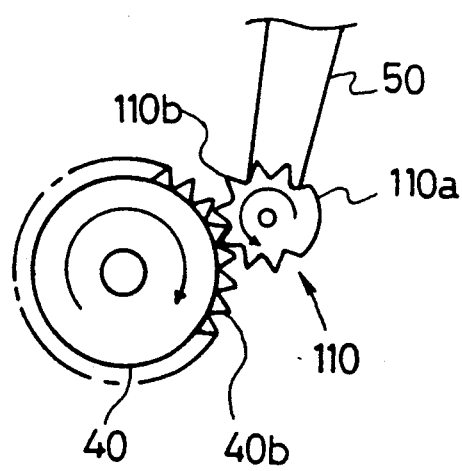
FIGS. 7A and 7B show the operation of a free gear in the second embodiment.
Figure 7B:
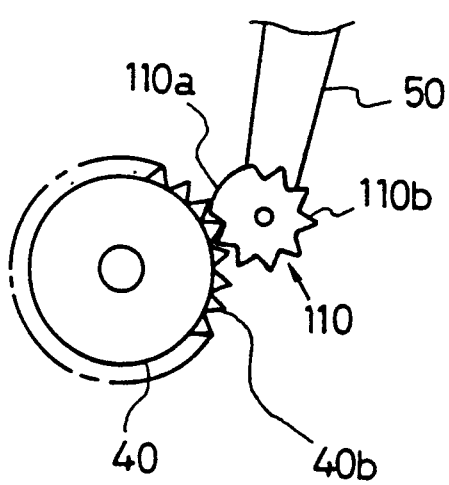

FIGS. 7A and 7B show the operation of the free gear 110.

Upon finishing the playback of the recorded sounds, the tone arm 50 approaches the rotating shaft 3b of the turn table 3, and thus, the free gear 110 engages with the teeth 40b of the center gear 40. For a while, the free gear 110 rotates with its teeth 110b engaged with the teeth 40b of the center gear 40. However, when the intermittent portion 110a of the free gear 110 reaches an interstitial portion of center gear teeth, the teeth 40b of the center gear 40 have no counterpart and the center gear 40 stops rotation. As a result, the cam mechanism 10 is extended axially, as described for the first embodiment.

In this case, since the position or appearance of the intermittent portion 110a of the free gear 110 is decided randomly in time, the stopping position of the disk record 2, caused when the switch SW2 is opened, is also decided at random. As a result, the relationships between the pickup 8 and the playback starting points of the plurality of modulated grooves 2' are variable. Accordingly, in the second embodiment, the selection of the recorded sounds to be reproduced is highly random.

Other operations in the second embodiment are the same as in the first embodiment.

As described in the foregoing, in the present invention, since a stylus force releasing mechanism is structured so that a center gear 4 and a center gear locking gear formed on a tone arm 5 operate a cam mechanism 10, the number of components is maintained at a minimum, and a compact, durable, and easily assembled simplified acoustic playback apparatus can be achieved.

Furthermore, when the center gear locking member is formed by a claw 11, the stopping of the rotation of the center gear can be attained in a simple manner, and the correct operation can be insured.

Furthermore, when the claw 11 is supported by the tone arm 5 through an elastic arm or elastic bar, the shock at the time of engagement of the claw 11 with the center gear 4 is absorbed and is not transmitted to the tone arm, and thus the modulated groove 2' of the disk record 2 and the playback stylus 8a are not broken.

Moreover, when an elastic arm 13 having the claw is formed integrally with the tone arm 5, the manufacturing process is simplified, the joining strength is increased and the durability is improved.

In addition, when a free gear 110 having an intermittent portion 110a is used, the stopping position of the disk record 2 is determined at random, and it is possible to enjoy random playback of a plurality of modulated grooves having different starting points on the periphery of the disk record.

Having, thus, described the invention, what is claimed is:

1. In an acoustic playback apparatus including a turn table having a disk record placed and driven by a driving device through a center gear, and a tone arm having a pickup and a tip end to scan a modulated groove on the disk record, the improvement comprising:
   (a) a center gear locking member provided for stopping the turning of the center gear by engaging the center gear, the locking member comprising a claw;
   (b) means for supporting the center gear locking member laterally disposed from the tone arm, the means for supporting comprising a claw support member integrally connected to the tone arm at one end and the claw at the other end, the claw support member being an elastic bar shaped arm, the arm being an integral extension of the tone arm; and
   (c) a plurality of modulated grooves on the disk, the grooves having separate starting points on the circumference of said disk.

2. A acoustic playback apparatus comprising:
   (a) a casing comprising:
      (1) a chassis having a first hollow formed therein;
      (2) a housing having a second hollow formed therein, the housing having a housing finger formed thereon projecting into the housing hollow, the housing and chassis being joined so as to form a central cavity;
      (3) means for dividing the central cavity into at least two chambers, the cavity-dividing means having an aperture formed therein;
   (b) a turn table unit disposed within the casing the turn table unit comprising:
      (1) a turn table platter for supporting a disk record;
      (2) a central shaft rotatably mounted on the housing process and coaxially affixed to the platter,
      (3) a disk record having a modulated groove formed therein, the disk record coaxially supported by the platter;
   (c) means for demodulating the disk record, the demodulation means comprising:

(1) a stylus for contacting the modulated groove of the disk record, (2) a pickup held by a tone arm, the pickup holding the stylus;

(3) a tone arm, the tone arm being pivotally mounted to the intermediate partition so as to permit the stylus to move through the central cavity dividing means aperture when the stylus is in contact with the modulated groove of the disk record;

(4) means for normally biassing the tone arm to the beginning of the disk record;

(5) a speaker for amplification and transmission of demodulated sounds, the speaker being in physical contact with the tone arm when the recording disk is demodulated, the speaker being attached to the chassis and occupying a portion of the chassis hollow;

(d) means for rotatably driving the turn table;

(e) means for urging the turn table and disk record into contact with the stylus;

(f) a means for removing stylus-to-disk record contact comprising:

(1) a center gear coaxially mounted to the turn table central shaft, the center gear being coplanar with the tone arm;

(2) gear locking means mounted on the tone arm and coplanar with the center gear for mating with the center gear to thereby stop the rotation of the center gear;

(3) a lengthenable cam assembly comprising:

(i) a first cam piece having a face inclined to the axis of the turn table unit, the first cam piece being coaxially affixed to the center gear;

(ii) a second cam piece being coaxially affixed to the turn table shaft, the second cam piece having a face inclined to the axis of the turn table unit, the second cam piece inclined face located in mating opposition to the first cam piece inclined face; and (iii) means for normally biassing the first cam piece inclined face to mate with the second cam piece inclined face, the cam biassing spring having a higher spring tension force than the force of the turn table urging means.

3. The acoustic playback apparatus according to claim 2 wherein the means for driving the turn table further comprises:

(a) a motor, having a motor drive shaft for providing rotational motion, the motor affixed to the casing;

(b) a belt substantially frictionally surrounding the motor drive shaft and a peripheral edge of the turn table platter, and (c) means for powering the motor.

4. The acoustic playback apparatus according to claim 3 wherein the means for driving the turn table further comprises: control circuitry for selectively varying the power to the motor, the circutry comprising:

(a) a variable resistor mounted on the casing, the variable resistor being in electrical series with the motor and the motor powering means;

(b) a first switch mounted on the casing, the switch being spring loaded to be normally open, the switch being in electrical series with the variable resistor;

(c) a second switch in parallel with the first switch, the second switch being open when the tone arm is at the beginning of the disk record and closed when not at the beginning of the disk record.

5. The acoustic playback apparatus of claim 4 wherein the center gear is slidably mounted in the axial direction.

6. The playback apparatus according to claim 5 wherein the gear locking means comprises at least one claw-like member.

7. The playback apparatus according to claim 6 wherein the tone arm comprises:

a support member, the support member being integrally connected to the tone arm at one end and integrally connected to the claw-like member at the other end, the support member comprising an elastic bar shaped arm extending substantially parallel to the tone arm.

8. The playback apparatus according to claim 2 wherein the interlocking means comprises:

a freely rotating gear being a gear blank with a large portion of an outside diameter surface thereof having a plurality of gear teeth formed thereon and a remaining smaller portion of the outside diameter surface having no gear teeth.

9. The playback apparatus according to claim 6 wherein the disk record has a plurality of modulated grooves starting at different points along the periphery of the disk record.

10. In an acoustic playback apparatus including a turntable having a disk record placed thereon and driven by a driving device through a center gear, and a tone arm having a pickup at the tip end to scan a modulated groove on the disk record, the improvement comprising:

(a) a center gear locking member provided for stopping the turning of the center gear by engaging the center gear, the locking member comprising a free gear provided on the tone arm, the free gear being a circular gear blank having an outside diameter portion with a plurality of gear teeth formed thereon and a remaining smaller unformed portion of the outside diameter surface having no gear teeth, the free gear rotatably engaging the center gear until the unformed portion of the free gear stops the rotation; and (b) a plurality of modulated grooves on the disk, the grooves having separate starting points on the circumference of said disk.

11. An apparatus according to claim 10 wherein said support arm comprises:

an elastic support bar.

12. In an acoustic playback apparatus including a turntable having a disk record placed thereon and driven by a driving device through a center gear, and a tone arm having a pickup at the tip end to scan a modulated groove on the disk record, the improvement comprising:

(a) a center gear locking member, the locking member comprising:

a claw having a long side, a locking side, and a back side and being generally in the form of an obtuse triangle, the locking side and the long side of the claw intersecting to form a point for engaging the center gear, the locking side of the claw urging against a gear tooth of the center gear to stop the center gear's rotation; and (b) means for supporting the center gear locking member, the means for supporting comprising:

a support arm being an elongated bar laterally disposed from the tone arm, the support arm being integrally connected to the tone arm at one end and integrally connected to the locking side of the claw, proximate to the intersection of the locking side and the back side, at the other end.

* * * * *

UNITED STATES PATENT AND TRADEMARK OFFICE
CERTIFICATE OF CORRECTION

PATENT NO. : 5,103,442
DATED : April 7, 1992
INVENTOR(S) : Eishi Koike, Sagamihara; Seiji Ohata, Kawasaki It is certified that error appears in the above-identified patent and that said Letters Patent is hereby corrected as shown below:

Column 2, line 64, after "chasis", delete "1a" and replace with --1b--;
Column 2, line 65, after "housing" delete "1b" and replace with --1a--;
Column 2, line 66, after "chasis" delete "1a" and replace with --1b--;
Column 2, line 68, after "chasis" delete "1a" and replace with --1b--.

Column 3, line 1, after "chasis" delete "1a" and replace with --1b--;
Column 3, line 1, after "chasis" delete "1a" and replace with --1b--.

Column 4, line 5, after "housing" delete "1b" and replace with --1a--;
Column 4, line 6, after "chasis" delete "1a" and replace with --1b--;
Column 4, line 8, after "housing" delete "1b" and replace with --1a--;
Column 4, line 10, after housing delete "1b" and replace with --1a--;
Column 4, line 11, after "sis" delete "1a" and replace with --1b--.

Signed and Sealed this

Twenty-eighth Day of September, 1993

*Attest:*

BRUCE LEHMAN

*Attesting Officer*    *Commissioner of Patents and Trademarks*